Nov. 3, 1936.    H. CHIREIX    2,059,315

RADIOGONIOMETER

Filed July 17, 1935    2 Sheets-Sheet 1

INVENTOR
HENRI CHIREIX
BY
ATTORNEY

Nov. 3, 1936.  H. CHIREIX  2,059,315
RADIOGONIOMETER
Filed July 17, 1935  2 Sheets-Sheet 2

INVENTOR
HENRI CHIREIX
BY
ATTORNEY

Patented Nov. 3, 1936

2,059,315

UNITED STATES PATENT OFFICE 2,059,315

RADIOGONIOMETER

Henri Chireix, Paris, France, assignor to Compagnie Generale De Telegraphie Sans Fil, a corporation of France Application July 17, 1935, Serial No. 31,857
In France July 20, 1934

7 Claims. (Cl. 250—11)

This invention relates to radiogoniometers and has particular reference to a device in which directional signals may be received without being vitiated by night-effect errors.

It is well known that particularly during the dawn and twilight periods direct radiations are often accompanied by radiations which are reflected from the Kennelly-Heaviside layer. The indirect radiations because of the larger or longer paths which they traverse reach the receiver as echoes, that is to say, with a certain time lag which may be of the order of magnitude of 1/2000 of a second. Hence it is difficult to make radiation goniometric measurements unless these echo effects are in some way eliminated.

It is an object of my invention to provide radio receiving apparatus having indicating means associated therewith such that signals may be utilized for accurate determinations of direction. It is a further object of my invention to provide goniometric apparatus which, when influenced only by indirect radiations, will clearly indicate it to the observer.

Figure 1:
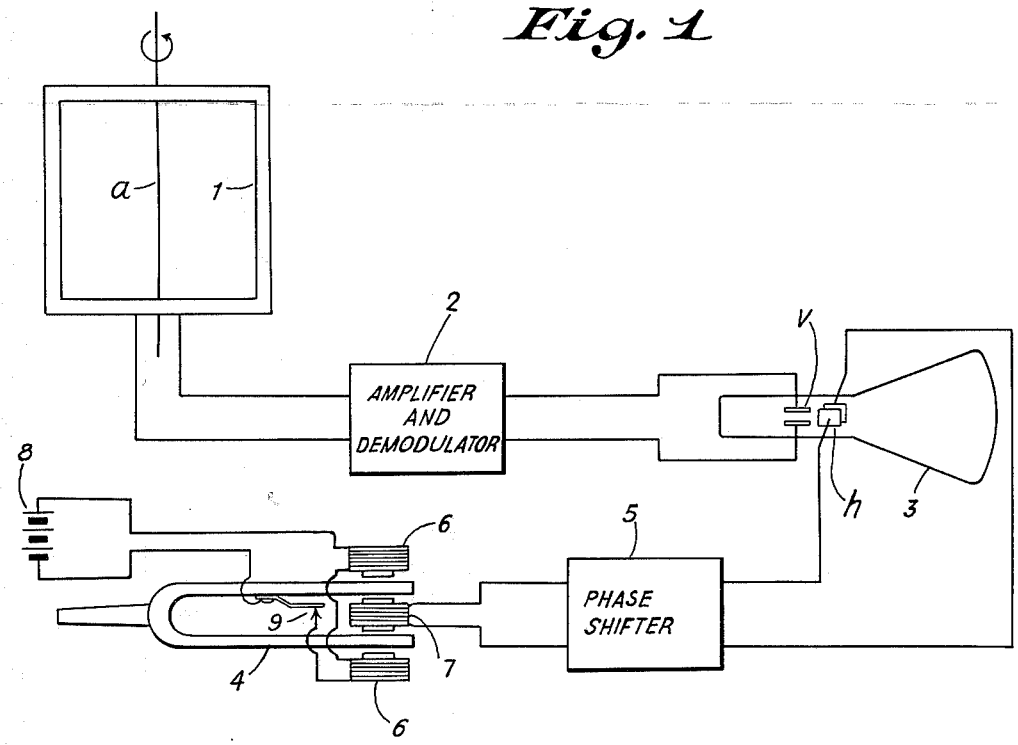
Figure 2:
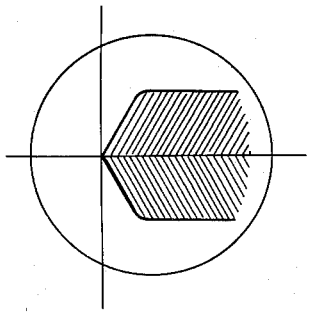
Figure 3:
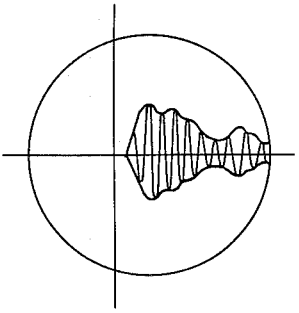
Figure 4:
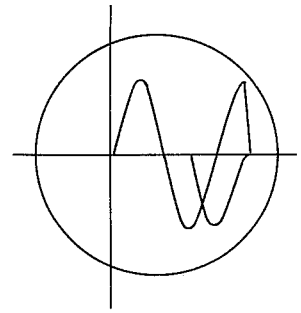
Figure 5:
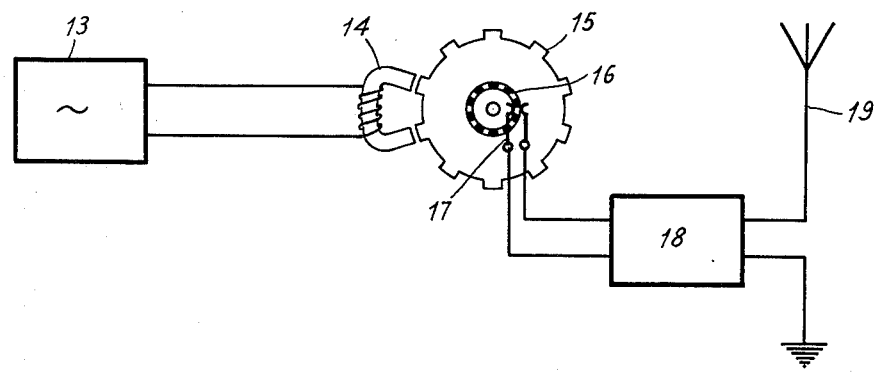
Figure 6:
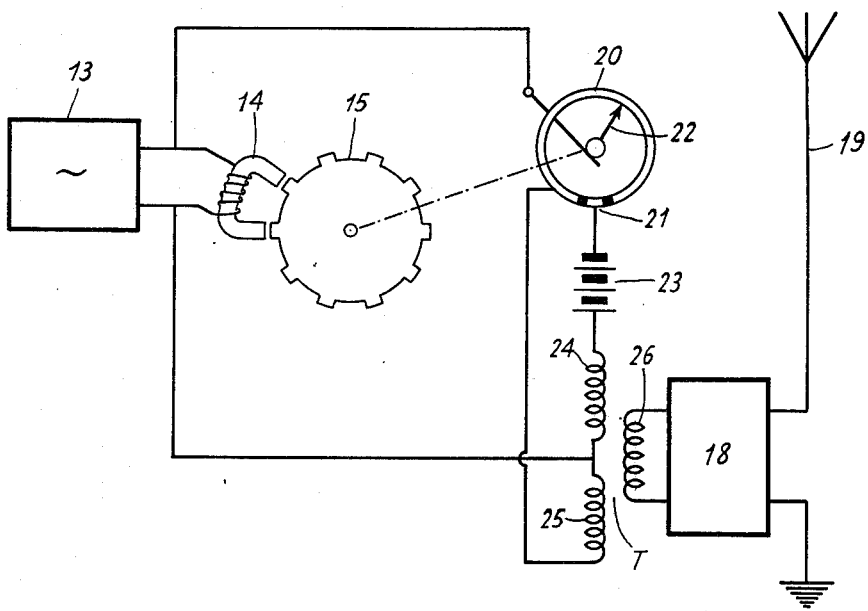

The novel features of my invention are set forth in the appended claims; the invention itself in the details of its structure and with regard to its mode of operation may, however, be best understood from the following detailed description when read in connection with the accompanying drawing in which:

Figure 1 shows diagrammatically a circuit arrangement of suitable receiving and indicating apparatus, Figures 2, 3 and 4 show respectively different image patterns to be projected upon the fluorescent screen of a cathode ray tube for indicating purposes, Fig. 5 shows diagrammatically an arrangement of apparatus suitable for use at a transmitting station, and Fig. 6 shows a modified arrangement of transmitting apparatus.

Referring first to Fig. 1, I show a rotatable antenna 1, the directional effect of which may be adjusted to suit any requirements by rotating the same on a vertical axis $a$. The antenna is shown connected to an amplifier and demodulator 2 having an output circuit which is connected with vertical deflecting plates $v$ within a cathode ray tube 3. The tube 3 is provided also with horizontal deflecting plates $h$ and with other electrodes which, of course, include a cathode and one or more focussing anodes (not shown).

My receiving system includes also a local source of oscillations which may, if desired, be constituted by a tuning fork 4 having magnets 6 for maintaining the tuning fork in a vibratory state and an inductive device 7 within which oscillations may be generated at the frequency of the tuning fork. The magnets 6 may be energized from a source of direct current potential 8 and in circuit with the magnets 6 I may utilize an interrupter comprising contact springs 9, one of which is carried on one of the legs of the tuning fork. The output energy from the coil 7 may be impressed upon a phase shifting device 5 and thence it may be impressed upon the horizontal deflecting plates $h$.

With the receiving apparatus as shown it is possible to obtain bearing indications when impulses are sent out by a transmitter or beacon in the form of successive dots at regular intervals, say, for example, at 1/50 of a second apart. It is preferable that the duration of each dot should be only about ⅓ to ¼ of the duration of the intervals between the dots. These dots may be transmitted with great regularity and precision if, for example, the transmitter is controlled by a phonic wheel, such a wheel being driven, if desired, by a tuning fork.

Referring to Fig. 5 I have shown therein one example of a suitable transmitting apparatus for carrying out the objects of the invention as above indicated. In this figure is shown a source of oscillations 13, the frequency of which may, for example, be determined by the use of a tuning fork as hereinbefore suggested. The energy from the source 13 is fed to the field magnet 14 of a phonic wheel motor having a toothed disc 15 and having a commutator arrangement consisting of segments 16 against which the brushes 17 are caused to make contact. It is preferable that the conducting segments 16 should be made relatively narrow compared with the width of the insulating segments therebetween. In fact they might suitably be made to subtend only ⅓ the arcs subtended by the insulating segments. The oscillator 13 may, for example, produce 50 impulses per second and if there are as many segments 16 as there are teeth on the phonic wheel 15, then the duration of each pulse initiated across the brushes 17 will be approximately 1/200 of a second. These short pulses may be communicated to the transmitter 18 at regular intervals in order to be sent out as signals on the antenna 19.

Referring to the embodiment of transmitter arrangements, as shown in Fig. 6, it will be seen that the same source of oscillations 13 is provided for operating the phonic wheel field magnet 14 to rotate the disc 15 at a constant speed. This disc 15 may now be caused to rotate a brush 22 which contacts with a collector ring 20 having an interrupted periphery. The brush 22 also contacts with a segment 21 insulated from the collector ring 20. The oscillations from the source 13 during a greater part of a revolution of the brush 22 may be impressed upon the transmitter 18 and sent out on the antenna 19 by virtue of the transformer action between the coils 25 and 26. However, at the moment when the brush 22 contacts with segment 21 a strong synchronizing signal may be sent through the circuit which includes battery 23 and the transformer primary coil 24, the latter being also in inductive relation to the secondary winding 26 so as to feed energy of the synchronizing impulse into the transmitter 18 and thence to the antenna 19.

At the point of reception of the signals the periodic impulses corresponding to those of the source 13 may be delineated on the cathode ray tube screen and along therewith the synchronizing impulses, corresponding with those from the source 23, may also be shown.

If the tuning fork at the transmitter has very nearly the same frequency of that of the tuning fork 4 at the receiver then the horizontal and vertical deflections in the cathode ray tube may be held in synchronism or nearly so. By suitable adjustment of the phase shifter 5 the condition may be obtained in which the beginning of the signals will cut an accurately fixed place upon the cathode ray screen. This place should not vary appreciably throughout the entire time that measurements are being made. Due to the high degree of frequency constancy obtainable in the use of tuning forks it is readily possible to maintain the fixed point of reference on a cathode ray tube screen.

When it is desired to obtain bearing indications the antenna loop 1 may be adjusted so that the beginning of the signals (the portion of the curve passing through the above predetermined point) may be extinguished. After such elimination there may still subsist some echo effects but the observer will know that these are only echo effects and not direct radiation effects and will eliminate themselves in appreciating the correctness of the bearing.

The operation of my apparatus may be further described as follows:

The amplifier and demodulator 2 is attuned so that the incoming interrupted high frequency signal will produce on the cathode ray tube screen a wave with a crest as high as possible, the enveloping curve of this wave passing through a predetermined cross point of horizontal and vertical lines as shown in Fig. 2. The hatched surface between the enveloping curves corresponds to the area occupied by high frequency oscillation pattern. Next the trace of the cathode ray at this predetermined point is caused to be eliminated by shifting the loop 1. The pattern of the cathode ray then becomes as shown in Fig. 3, the deviations being due to indirect signals and being not taken in consideration by the observer.

If the transmitter is adapted to send out interrupted carrier waves then it is desirable that the transient periods be of less than 1/1000 of a second in duration and perhaps even less than 1/2000 of a second. If, however, modulated signals are transmitted it is necessary that the modulation should start almost at the same point of a cycle or period, for instance, at the instant when a modulation wave passes through a zero point. This, however, is readily realizable by controlling the carrier frequency transmission by a phonic wheel. If the phonic wheel is driven by a tuning fork giving directly a frequency of 600 cycles per second, and if this wheel carries transmission contacts giving short synchronizing signals at the end of each modulation train at 1/50 second intervals, then signals modulated very accurately in the same point of a cycle are obtained. The wave pattern to be observed on the cathode ray screen becomes as shown in Fig. 4 where it is assumed that the signal is transmitted during 1¼ modulation periods. The sine wave on the figure represents therefore a modulation curve which begins at the predetermined cross point of the horizontal and vertical lines and which is cut off after 1¼ periods. Shortly before the signal end, the phonic wheel gives a synchronizing signal which is seen on the pattern as a half wave below the horizontal reference line, this wave terminating together with the signal.

I claim:

1. In a radio goniometer, a transmitter having means for emitting brief signals at regular intervals, a directional antenna for collecting the energy of said signals, a radio receiver having amplifying and demodulating means responsive to said signals, a cathode ray tube having horizontal and vertical deflecting circuits, one of said deflecting circuits being so connected to said demodulating means as to produce an amplitude component of a received signal pattern, means including a local source of oscillations connected to the other of said deflecting circuits for producing a time component of said signal pattern, and means for maintaining synchronism between said local source and the transmitted signals.

2. In a direction finding system means for transmitting and receiving interrupted carrier wave signals, means for maintaining substantially constant the duration of the signals and of the intervening time intervals, an indicating device comprising a cathode ray tube having horizontal and vertical deflecting means for controlling an electron beam therein, an output circuit for said receiving means connected to one portion of said deflecting means, a source of oscillatory energy connected to the other portion of said deflecting means, said source being synchronized with the repetition frequency of said signals, a phase shifting device interposed between said source and said deflecting means, and means including a directional antenna system for causing the effects of direct radiation upon said receiving means to be suppressed while the effects of reflected radiation are only impressed upon said receiving means thereby to produce an image pattern on the screen of said cathode ray tube which is indicative of the directional orientation of said antenna system with respect to the direction from which the signals emanate.

3. A device in accordance with claim 2 and further characterized in that a tuning fork is provided for maintaining constant the frequency of said source of oscillatory energy.

4. In a radio receiving system a radiant energy collecting device mounted for directional orientation with respect to a modulated radiant energy transmitter, an amplifier and detector operatively connected to said collecting device, a cathode ray tube having horizontal and vertical deflecting circuits, one of said circuits being connected to the output side of said detector, means including a tuning fork for generating oscillations of a frequency substantially equal to the frequency of modulation of said radiant energy, and a circuit including a phase shifting device connecting said oscillation generating means with the other of said deflecting circuits.

5. In a radio goniometer, means for transmitting a uniform series of brief signals, a receiving antenna adapted to be so oriented with respect to the direction of direct radiation of said signals as to minimize the effects thereof, a cathode ray tube having means for deflecting its electron beam both horizontally and vertically, means for deflecting the beam in one direction under control of the received signals and at the frequency of repetition thereof, means including a local oscillator for applying a deflection component to said beam in a direction perpendicular to the first said direction and means for producing on the screen of said cathode ray tube only an indication of the effects of indirect radiation of said brief signals as reflected from the Kennelly-Heaviside layer.

6. In a radio goniometer designed to eliminate night errors means for sending out at regular time intervals a series of brief signals, receiving means including a cathode ray tube or oscillograph, means for sweeping the electron pencil of said cathode ray tube both horizontally and vertically at the rhythm of the signals, means for extinguishing the effects of an initial portion only of each brief signal, this portion passing through a predetermined point, and means for producing a recurrent image pattern of said effects starting from a point other than the said predetermined point on the screen of said cathode ray tube.

7. The method of transmitting time marks by the agency of a phonic wheel driven by a tuning fork, and of indicating the effects of said time marks at a point of reception thereof which comprises minimizing said effects due to the reception of direct radiation, and then indicating the resultant of said effects due to the reception of indirect radiation in coordination with the effects of a locally produced oscillation at the frequency of said tuning fork.

HENRI CHIREIX.